United States Patent
Hochhalter et al.

(10) Patent No.: US 8,072,107 B2
(45) Date of Patent: Dec. 6, 2011

(54) PERMANENT MAGNET MOTOR OR ACTUATOR WITH FIELD WEAKENING CAPABILITY

(75) Inventors: Keith Hochhalter, Inverness, IL (US); Mike Seiler, Kenosha, WI (US)

(73) Assignee: Creative Motion Control, Inc, Bellevue, WA (US)

( * ) Notice: Subject to any disclaimer, the term of this patent is extended or adjusted under 35 U.S.C. 154(b) by 0 days.

(21) Appl. No.: 12/677,747

(22) PCT Filed: Sep. 11, 2008

(86) PCT No.: PCT/US2008/076028
§ 371 (c)(1),
(2), (4) Date: Mar. 11, 2010

(87) PCT Pub. No.: WO2009/036179
PCT Pub. Date: Mar. 19, 2009

(65) Prior Publication Data
US 2010/0213779 A1 Aug. 26, 2010

(51) Int. Cl.
*H02K 21/12* (2006.01)
(52) U.S. Cl. ......... 310/156.24; 310/156.33; 310/156.37; 310/154.48
(58) Field of Classification Search ............. 310/156.01, 310/156.07, 156.24, 156.37, 156.48, 156.33
See application file for complete search history.

(56) References Cited

U.S. PATENT DOCUMENTS 6,636,788 B2 * 10/2003 Tamagawa et al. ............. 701/22
2007/0205683 A1 * 9/2007 Kawamura et al. ........... 310/114

FOREIGN PATENT DOCUMENTS
JP 2004064942 A * 2/2004

OTHER PUBLICATIONS
Machine translation JP2004064942 (2004).*
* cited by examiner

*Primary Examiner* — Quyen Leung
*Assistant Examiner* — Jose Gonzalez Quinones
(74) *Attorney, Agent, or Firm* — Dean A. Craine

(57) ABSTRACT

The present disclosure relates generally to a permanent magnet, brushless motor comprising a primary rotor having alternating magnetic poles around a circumference, a secondary rotor similar to the primary rotor. The primary rotor may be free to rotate by approximately plus or minus one pole of the secondary rotor. As such, when the two rotor components have opposite polarities aligned, the motor may be in a field weakened state. Generally, the field weakened state may be the normal state of the motor. As a significant load is encountered, the rotors may automatically transition to a non-weakened state wherein similar polarities are aligned on the rotors. A permanent magnet, brushless motor as described herein may be employed at a motor level or integrated into a linear actuator, wherein the rotor of the permanent magnet, brushless motor may include a hollow shaft.

19 Claims, 4 Drawing Sheets ial movements of automated welding guns, automated clamping fixtures, and the like. For example, in the automotive industry, injection molding industry, and various other industries, actuation and control of welding guns and clamping fixtures and controlled linear movement of other fixtures and devices have been accomplished using fluid actuators, such as pneumatic or hydraulic actuators. While fluid actuators have functioned reasonably well for these purposes, they inherently embody various limitations. One, because of the possibility of leaks and failure of seals, etc., there is always the concern of contamination of the worksite by a leaking fluid. Second, fluid actuators necessarily require a source of pressurized fluid, and thus, a fluid supply system. This leads to significant maintenance and other costs. Third, limitations sometimes exist with respect to the accuracy and positioning of linear movement and the adjustability of such movement.

PERMANENT MAGNET MOTOR OR ACTUATOR WITH FIELD WEAKENING CAPABILITY

FIELD OF THE INVENTION

The present disclosure relates to apparatus and methods for a servo actuator or motor. More particularly, the present disclosure relates to apparatus and methods for a servo actuator or permanent magnet, brushless motor having field weakening capability.

BACKGROUND OF THE INVENTION

Various industries, and particularly the manufacturing industry, among others, have utilized rotary motors and linear actuators to control movements of automated welding guns, automated clamping fixtures, and the like. For example, in the automotive industry, injection molding industry, and various other industries, actuation and control of welding guns and clamping fixtures and controlled linear movement of other fixtures and devices have been accomplished using fluid actuators, such as pneumatic or hydraulic actuators. While fluid actuators have functioned reasonably well for these purposes, they inherently embody various limitations. One, because of the possibility of leaks and failure of seals, etc., there is always the concern of contamination of the worksite by a leaking fluid. Second, fluid actuators necessarily require a source of pressurized fluid, and thus, a fluid supply system. This leads to significant maintenance and other costs. Third, limitations sometimes exist with respect to the accuracy and positioning of linear movement and the adjustability of such movement.

The use of permanent magnet, brushless motors is also well known. A permanent magnet, brushless motor is described in co-pending U.S. patent application Ser. No. 11/031,539, filed Jan. 7, 2005, entitled "Electric Actuator," and published as Publication No. 2005/0253469, the entirety of which is hereby incorporated by reference herein. The relationship between the rotation and torque of prior art permanent magnet, brushless motors is inversely proportional. That is, as the torque linearly decreases, the rotation speed, or number of rotations, increases.

In some prior art permanent magnet, brushless motors, a field weakening technique wherein the total magnetic flux is lowered to achieve high speed rotation has been employed. For example, a brushless motor that includes a field weakening technique is described in U.S. Pat. No. 5,821,710, issued to Masuzawa, et al. The brushless motor in Masuzawa includes two field permanent magnets having poles of different polarities alternately arranged in the direction of rotation, wherein one of the field permanent magnets is rotatable with respect to the other field permanent magnet. A mechanism for changing the phase of the magnetic poles of the field permanent magnets is provided to place the field permanent magnets out of phase as rotation increases. The mechanism uses arc-shaped governors held in a default, low rotation position using springs. The governors are forced into a high rotation position due to centrifugal force caused by the higher speed rotation. The high rotation position causes the field permanent magnets to be positioned out of phase, thus weakening the magnetic field.

Accordingly, there is a need in the art for improved apparatus and methods for a permanent magnet, brushless motor having field weakening capability which overcomes the deficiencies and limitations of the prior art. Particularly, there is a need in the art for apparatus and methods for a permanent magnet, brushless motor that may automatically transition from a field weakened position upon encountering a significant load.

BRIEF SUMMARY OF THE INVENTION

The present invention, in one embodiment, is a permanent magnet, brushless motor including first and second rotors having magnets spaced circumferentially around the outer surfaces thereof. Upon receiving a load, the rotors are automatically rotated relative to one another from a first position to a second position. In the first position, the polarity of the magnets on the first rotor is aligned with magnets of opposite polarity on the second rotor. In the second position, the polarity of the magnets on the first rotor is aligned with magnets of similar polarity on the second rotor. The relative configuration of the first and second rotors can be controlled by any of several means disclosed here.

The present invention, in another embodiment, is a method of increasing torque including rotating a motor, applying a load to the motor, and operably decoupling first and second rotors of the motor, such that the rotors are rotationally shifted with respect to each other into an increased torque position. The method may further comprise reducing the load such that the rotors are rotationally shifted with respect to each other back into the initial position.

The present invention, in yet another embodiment, is a motor including first and second rotors having magnets spaced circumferentially around the outer surfaces thereof and means for operably decoupling the first rotor from the second rotor. The rotors are decoupled from a default, low torque position into a high torque position based on reaching a threshold, increased load received by the motor.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present invention, it is believed that the invention will be better understood from the following description taken in conjunction with the accompanying FIGURES, in which:

The present disclosure includes novel and advantageous apparatus and methods for a permanent magnet, brushless motor with field weakening capability. More particularly, the present disclosure relates to apparatus and methods for a permanent magnet, brushless motor that may transition automatically between a weakened state and a non-weakened state. More particularly, the present disclosure relates to apparatus and methods for a permanent magnet, brushless motor that may transition automatically from a weakened state to a non-weakened state upon encountering a significant load. A weakened state may allow for higher rotation speeds achieved by reducing the back electromotive force ("BEMF") or generator properties of the motor. The permanent magnet, brushless motor with field weakening capability may be used for purely rotary applications as well as included in an actuator. Similarly, the permanent magnet, brushless motor with field weakening capability may be tuned or adapted to the particular application of use.

Generally, a secondary rotor component having alternating magnetic poles around a circumference may be provided. A primary rotor component may further be provided, wherein the primary rotor component is similar to the secondary rotor component and rotates at the same speed as the secondary rotor component. However, the primary rotor component may be free to rotate by approximately plus or minus ("+/−") one pole of the secondary rotor component. As such, when the two rotor components have opposite polarities aligned, or are out of phase with each other, the motor may be in a field weakened state. Generally, the field weakened state may be the normal, or default, state of the motor. As a significant load is encountered, the rotor components may automatically transition to a non-weakened state wherein similar polarities are aligned on the rotor components. A permanent magnet, brushless motor as described herein may be employed at a motor level or integrated into a linear actuator, wherein the rotor of the permanent magnet, brushless motor may include a hollow shaft such that a screw may be run through the center of the motor. Some applications in which a permanent magnet, brushless motor may be used in purely rotary applications include, but are not limited to, a vacuum pump or hybrid vehicle. Similarly, a permanent magnet, brushless motor may be used in an actuator to control movements of automated robotic, pedestal, or fixture welding guns, automated clamping fixtures, etc.

In describing motor embodiments of the present disclosure, the terms "proximal" and "distal" will sometimes be used to define directions/orientations relative to the motor. Specifically, the term "proximal" shall mean the direction which is toward an end of the motor that is opposite a load receiving end, while the term "distal" shall mean the direction which is toward the connection end, or load receiving end, of the motor.

Figure 1:
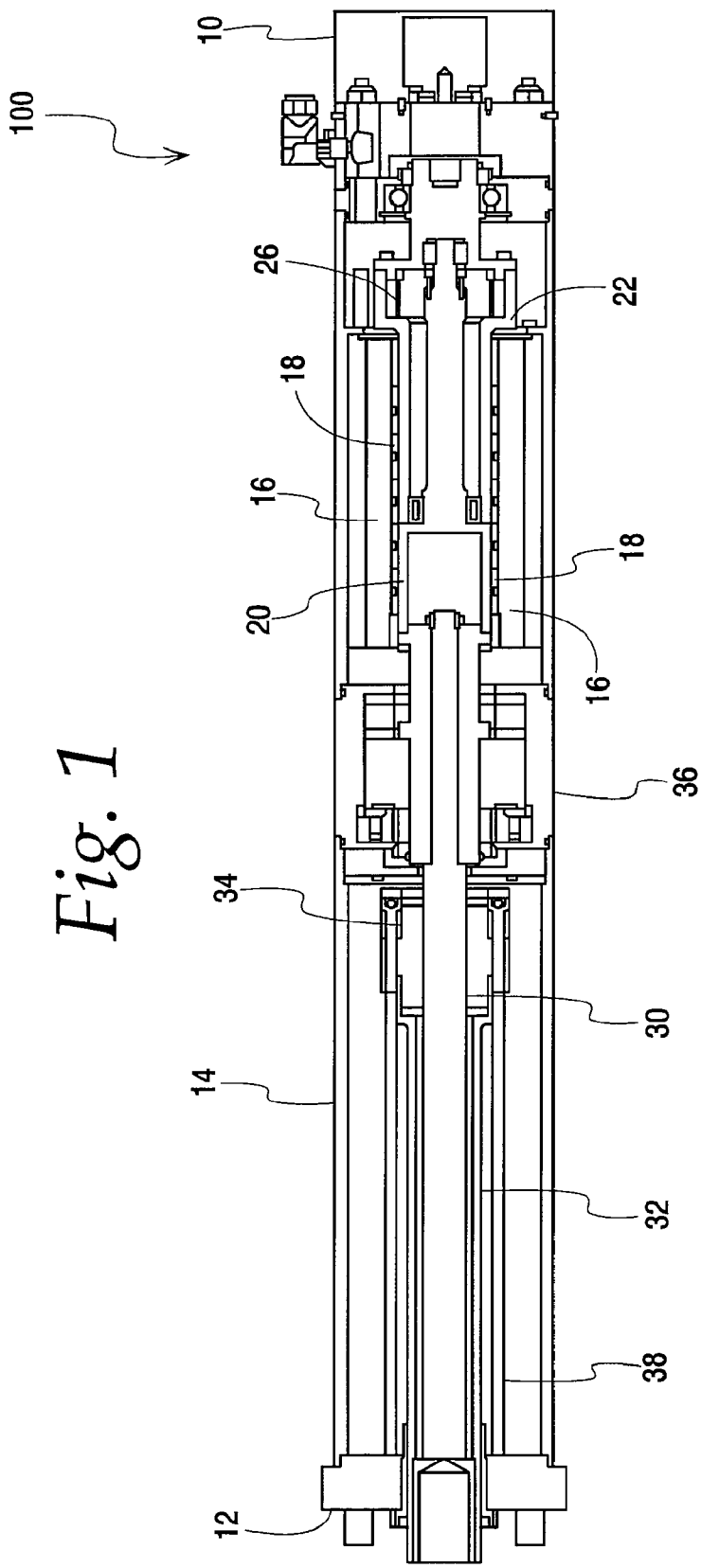
FIG. 1 is a side cross-section of one embodiment of a permanent magnet, brushless motor in accordance with the present disclosure.

In one embodiment, a permanent magnet, brushless motor 100, as illustrated in FIG. 1, may include a motor housing comprising of a proximal head end or block 10, a distal head end or block 12, and a centrally positioned peripheral housing portion 14. As shown, the housing portion 14 may be positioned between the end blocks 10 and 12 and may be retained in that position between the blocks 10 and 12 in a conventional or other suitable manner. A motor 100 may generally comprise a plurality of motor windings 16, a plurality of motor magnets 18, a primary rotor 22, and a secondary rotor 20 positioned between the end blocks 10 and 12 and radially inwardly of the housing portion 14.

As was previously mentioned, the motor 100 may be used as a linear actuator. For example, a threaded, elongated shaft or lead screw and other suitable components may be included in the motor 100, positioned radially inwardly from the secondary 20 and primary 22 rotors and function to convert rotational motion of the rotors 20, 22 to linear movement of the lead screw or other suitable load transfer member, such as a threaded nut circumferentially surrounding the lead screw.

As used herein, the term "thread" or "threaded" may include any conventional or other threads such as ACME threads, roller screw threads, ball nut threads, or any means known in the art to convert rotational motion to linear motion.

Figure 2:
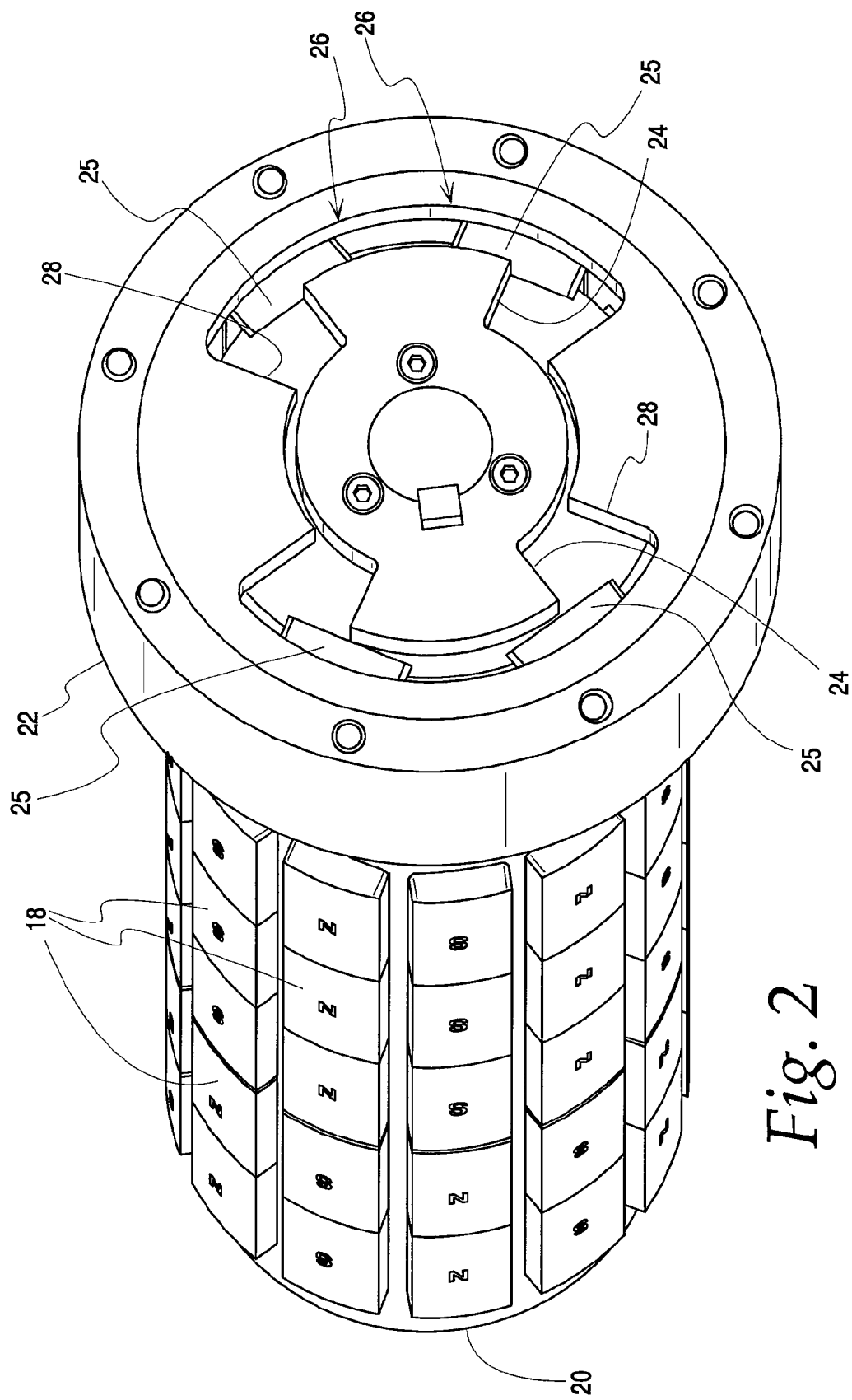
FIG. 2 is an isometric view of the primary and secondary rotors and the rotor configuration mechanism of the permanent magnet, brushless motor of FIG. 1 in accordance with the present disclosure.
Figure 4:
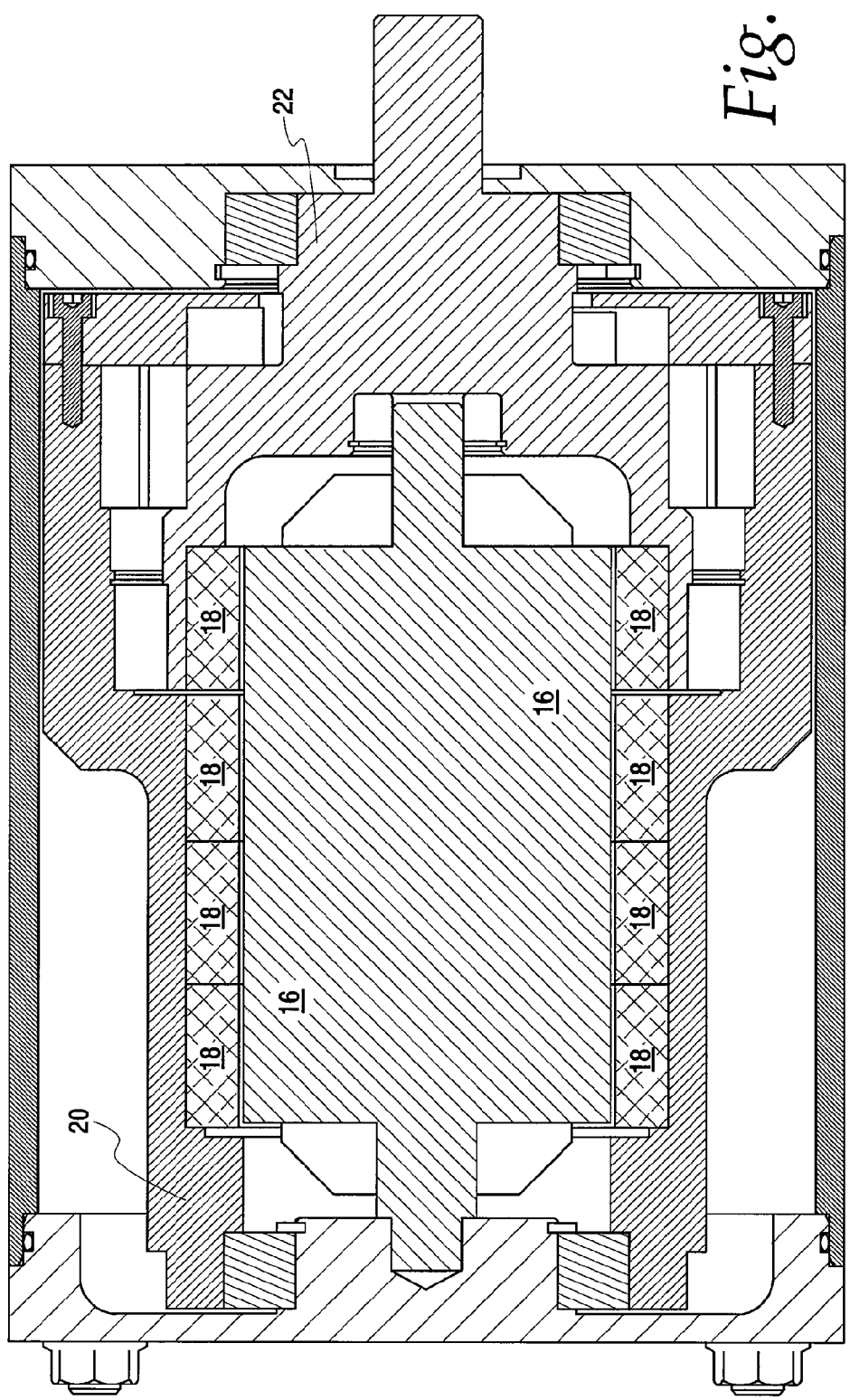
FIG. 4 is a side cross-section of an alternate embodiment of the permanent magnet, brushless motor of FIG. 1.

With reference to FIGS. 1 and 2, the motor 100 may comprise a primary rotor 22, a secondary rotor 20, and one or more stationary motor windings 16. The windings 16 may be positioned radially outwardly of the rotors 20, 22 and fixed relative to the motor housing 14. The rotors 20, 22 may be generally cylindrical members having generally cylindrical outer surfaces. Alternatively, the windings 16 may be positioned radially inwardly of the rotors 20, 22 in a fixed position as suggested by the motor arrangement shown in FIG. 4.

The secondary rotor 20 may be provided with a plurality of motor magnets 18. As shown, the magnets 18 may be mounted so that they extend axially along an outer surface of the secondary rotor 20 between its proximal and distal ends. In the embodiment of FIG. 2, the magnets 18 may be attached to the outer surface of the secondary rotor 20 and may protrude radially from the outer surface. In other embodiments, the magnets 18 may be inlaid within an outer surface portion of the secondary rotor 20. For example, axially extending portions of the outer surface of the secondary rotor 20 may be removed by machining or the like to form axially extending channels or grooves around the cylindrical periphery of the secondary rotor 20. These channels or grooves may permit the magnets 18 to be inlaid within these channels or grooves in the outer surface of the secondary rotor 20. In yet further embodiments, the magnets 18 may be inlaid or embedded within the rotor such that no portion of the magnet protrudes from the outer surface of the secondary rotor 20, and in some cases, may be completely embedded within the secondary rotor 20, such that no portion of the magnets 18 is on the outer surface of the secondary rotor 20.

The axially extending magnets 18 may be separated circumferentially around the secondary rotor 20, as can be seen in FIG. 2. Additionally, the magnets 18 may alternate in polarity circumferentially around the secondary rotor 20. That is, if an axially extending magnet 18 has a North polarity, then the next circumferentially located magnet 18 may have a South polarity, and so on.

The secondary rotor 20 may extend axially within the primary rotor 22, described in further detail below. The secondary rotor 20 may further be operably connected to a load or load receiving end of the motor 100. The secondary rotor 20 and the primary rotor 22 may be rotatable relative to each other. As such, the primary 22 and secondary 20 rotors, at some times, may be aligned such that the polarity of the magnets 18 provided on the secondary rotor 20 are aligned, or in phase, with the magnets 18 of similar polarity provided on the primary rotor 22. At other times, the polarity of the magnets 18 provided on the secondary rotor 20 is not aligned with the magnets 18 of similar polarity provided on the primary rotor 22. And, at yet other times, the polarity of the magnets 18 provided on the secondary rotor 20 are aligned with the magnets 18 of opposite polarity provided on the primary rotor 22.

A stop 24, extending radially outward from the secondary rotor 20, may be operably connected to a proximal end of secondary rotor 20. In further embodiments, more than one stop 24 may be operably connected to a proximal end of the secondary rotor 20. A magnet 25 comprising a first portion of a magnetic coupling device 26 may also be operably connected to a proximal end of the secondary rotor 20. In one embodiment, the magnet 25 comprising the first portion of the magnetic coupling device 26 may be located on an outer surface of the portion of the secondary rotor 20 extending radially within the primary rotor 22. In a further embodiment, the magnet 25 comprising the first portion of the magnetic coupling device 26 may comprise six poles of one inch, 30 degree magnets. Another portion of the magnetic coupling device 26 may be operably coupled to a proximal end of the primary rotor 22, as will be discussed in further detail. It is recognized, however, that the magnetic coupling device 26 may be located at any suitable location axially along the primary 22 and secondary 20 rotors. The magnetic coupling device 26 may operably couple the primary 22 and secondary 20 rotors in a default, high speed rotation configuration. That is, the magnetic coupling device 26 may operably couple the secondary 20 and primary 22 rotors in a default position, wherein the polarity of the magnets 18 provided on the secondary rotor 20 are aligned with the magnets 18 of opposite polarity provided on the primary rotor 22.

Figure 3:
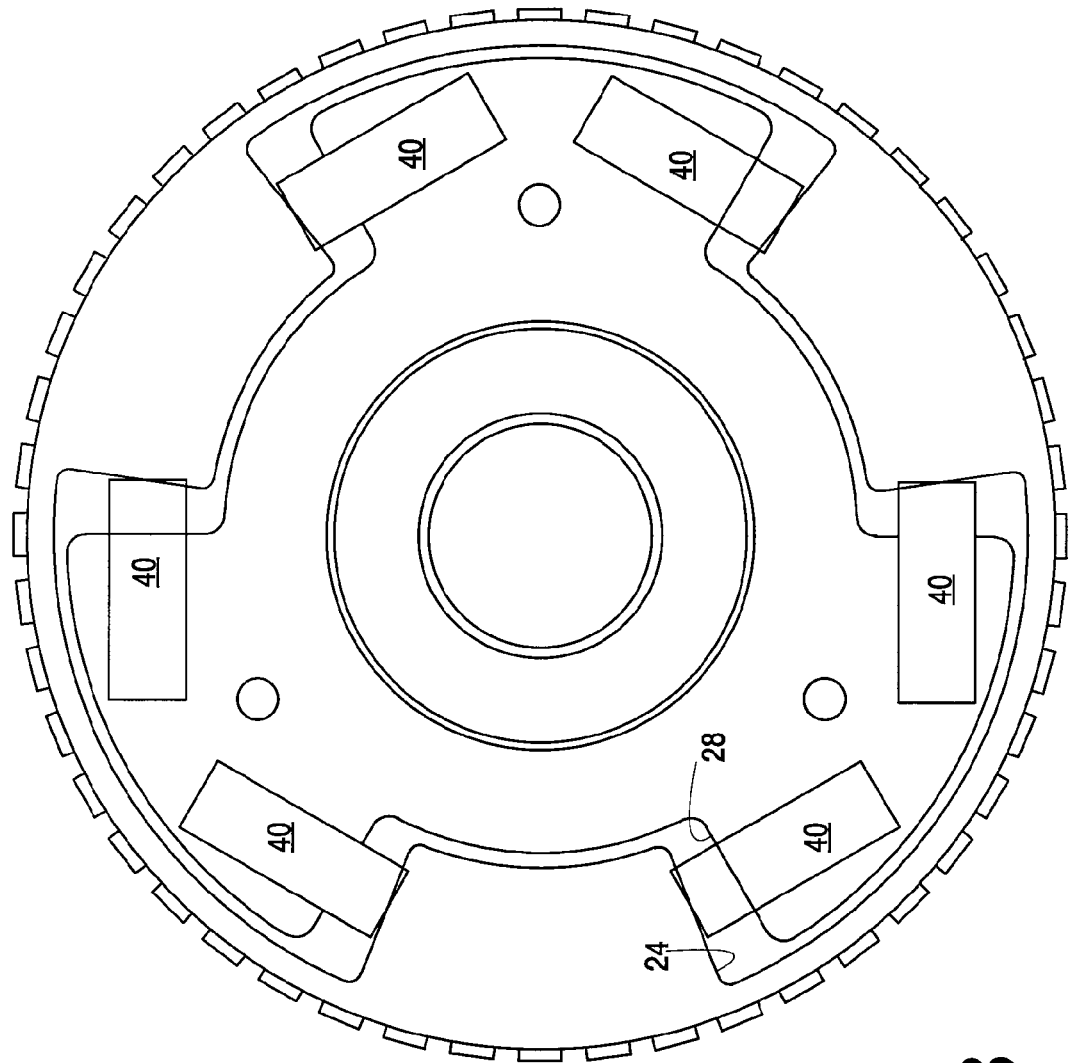
FIG. 3 is a plan view of an alternate embodiment of the rotor configuration mechanism.

It is noted that other suitable coupling devices may be used to achieve the same effect in accordance with the present invention. For example, high durometer resilient elastomeric biasing springs 40 can be provided as shown in FIG. 3. These springs 40 provide a different torque response characteristic to the motor than the torque response provided by the magnetic coupling devices 26 described above.

The primary rotor 22 may be described in a substantially similar manner as the secondary rotor 20. That is, the primary rotor 22 may be provided with a plurality of motor magnets 18. As shown, the magnets 18 may be mounted so that they extend axially along an outer surface of the primary rotor 22 between its proximal and distal ends. In one embodiment, the magnets 18 may be attached to the outer surface of the primary rotor 22 and may protrude radially from the outer surface. In other embodiments, the magnets 18 may be inlaid within an outer surface portion of the primary rotor 22. For example, axially extending portions of the outer surface of the primary rotor 22 may be removed by machining or the like to form axially extending channels or grooves around the cylindrical periphery of the primary rotor 22. These channels or grooves may permit the magnets 18 to be inlaid within these channels or grooves in the outer surface of the primary rotor 22. In yet further embodiments, the magnets 18 may be inlaid or embedded within the rotor such that no portion of the magnet protrudes from the outer surface of the primary rotor 22, and in some cases, may be completely embedded within the primary rotor 22, such that no portion of the magnets 18 is on the outer surface of the primary rotor 22.

The axially extending magnets 18 may be separated circumferentially around the primary rotor 22, as can be seen in FIG. 2. Additionally, the magnets 18 may alternate in polarity circumferentially around the primary rotor 22. That is, if an axially extending magnet 18 has a North polarity, then the next circumferentially located magnet 18 may have a South polarity, and so on.

The primary rotor 22 may be operably coupled to a rotary encoder or other similar means. The rotary encoder may be used to phase the motor 100 to the primary rotor 22. That is, the position of the primary rotor 22 in relation to the windings 16 may define the phasing of the motor 100. By establishing a reference of the primary rotor 22 to an encoder index pulse or absolute encoder position, a drive for the motor 100 can know how to commutate.

The primary rotor 22 may further include one or more blocks 28 aligned with the stop(s) 24 operably coupled to the secondary rotor 20. A block 28 of the primary rotor 22 may engage with a stop 24 of the secondary rotor 20 to retain the primary rotor 22 from over-rotation. That is, a block 28 may engage with a stop 24 to keep the primary rotor 22 from rotating more than +/− one pole of the magnets 18 of the secondary rotor 20. Generally, a block 28 of the primary rotor 22 may only engage a stop 24 of the secondary rotor 20 while the primary 22 and secondary 20 rotors are not operably connected by the magnetic coupling device 26, or other suitable coupling device.

A magnet comprising a second portion of the magnetic coupling device 26 may be operably connected to the primary rotor 20. In one embodiment, the magnet comprising the second portion of the magnetic coupling device 26 may be located on an inner surface of the primary rotor 20, which extends radially around the secondary rotor 22. In a further embodiment, the magnet comprising the second portion of the magnetic coupling device 26 may comprise six poles of one inch, 30 degree magnets. As previously described, the magnetic coupling device 26 may function to operably retain the secondary 20 and primary 22 rotors in a default, high speed rotation configuration.

The motor 100 may be used for linear or rotary applications. In a linear embodiment, for example, a threaded, elongated shaft or lead screw 30 and other suitable components may be included in the motor 100, positioned radially inwardly from the secondary 20 and primary 22 rotors and function to convert rotational motion of the rotors 20, 22 to linear movement of the lead screw 30 or other suitable load transfer member, such as a threaded nut 34 circumferentially surrounding the lead screw 30. In an alternative embodiment, the lead screw 30 may be linearly attached at or near the distal end of the secondary rotor 20, such that the lead screw 30 is positioned in-line with the secondary rotor 20 rather than positioned radially inwardly from the secondary 20 and primary 22 rotors. Such may be the case when the lead screw 30 has too large a diameter for efficiently positioning radially inwardly from the secondary 20 and primary 22 rotors. In one embodiment, the lead screw 30 may have about a two inch outer diameter. In other embodiments, the lead screw 30 may have other outer diameters, such as but not limited to, about 1 inch, 1½ inch, 1¾ inch, or 2¼ inch.

In one embodiment, the housing portion 14 may comprise a first and second housing portion. Each housing portion may comprise a self-contained unit, the first housing portion having the secondary 20 and primary 22 rotors and the second housing portion having the lead screw 30 and other actuator components. The two self-contained units may be manufactured independently and integrated together. In one embodiment, the two self-contained units may be integrated together with tie rods. In a further embodiment, a coupling unit 36 may be positioned between the self-contained units. In one embodiment, the coupling unit 36 may be manufactured of reinforced neoprene with a steel body. The coupling unit 36, in yet a further embodiment, may have a peak torque rating of about 4,700 in-lbs to 250° F.

The motor 100 may further comprise a thrust assembly comprising at least a thrust tube 32 and a threaded nut 34. The thrust tube 32 may be operably coupled to the threaded nut 34 and move linearly in conjunction therewith along the lead screw 30. As the lead screw 30 rotates, the threaded nut 34 may be held from rotation, thereby causing the threaded nut 34, and therefore, the thrust assembly, to move linearly along the lead screw 30. As used herein, the term "thread" or "threaded" may include any conventional or other threads such as ACME threads, roller screw threads, ball nut threads, or any means known in the art to convert rotational motion to linear motion.

In some embodiments, an anti-rotation rod 38 may be provided to guide the rotational orientation of the thrust tube 32. In other words, the anti-rotation rod 38 may retain the thrust tube 32 from rotating. The anti-rotation rod 38 may be removable, for example, where the motor 100 is used with guided tooling and an anti-rotation rod 38 is not desired. The anti-rotation rod 38 may be removably attached to a portion of the thrust tube 32, the threaded nut 34, or any other component that is part of the thrust assembly.

In further embodiments, the motor 100 may include an integrated warning for maintenance/failure of the motor 100. In one embodiment, the integrated warning may indicate that the motor 100 has failed or requires maintenance. In other embodiments, the integrated warning may indicate that the motor 100 is about to fail or should have a checkup. In some embodiments, the integrated warning may signify that the motor 100 has reached its estimated useful life or is about to reach its estimated useful life.

Specifications, requirements, and sizes of a motor 100 in accordance with the present disclosure may be varied and configured for a variety of applications. In one embodiment, the motor 100 may have a force of generally between 8,000 and 25,000 pounds. However, in other embodiments, the motor 100 may have a lesser or greater force characteristic. The motor 100 may have a maximum speed of about 20 inches per second. However, in alternative embodiments the maximum speed may be slower or faster than 20 inches per second. The motor may be designed for different voltage requirements, e.g., 400 Vac, 460 Vac, 575 Vac, etc. Furthermore, the motor 100 may be configured for different stroke lengths, such as 6 inch, 12 inch, or shorter or longer stroke lengths.

Having described the structure of the embodiment of FIGS. 1 and 2, its operation can be described as follows. The motor 100 may be driven by DC or AC current. In one embodiment, the motor 100 may typically be driven by sinusoidal or AC current. When the motor 100 is actuated, the secondary 20 and primary 22 rotors may be caused to rotate in a first direction. That is, the windings 16 may cause the secondary 20 and primary 22 rotors to rotate. The secondary 20 and primary 22 rotors may rotate in the same direction. Furthermore, where the load is not significant enough to cause the magnetic coupling device 26 to uncouple, the primary 22 and secondary 20 rotors may be operably coupled such that they may rotate at the same rotational speed and are aligned in a default position, wherein the polarity of the magnets 18 provided on the secondary rotor 20 are aligned with the magnets 18 of opposite polarity provided on the primary rotor 22. The default position, as illustrated in FIG. 2, may be used generally for high speed rotation in which less torque is required.

When a significant load is encountered by the motor 100, the magnetic coupling device 26 may become uncoupled. Specifically, in one embodiment, the magnetic coupling device 26 may slowly collapse the weakened field as the load increases. Therefore, the primary rotor 22 may be automatically caused to rotate relative to the secondary rotor 20, such that a stop 24 of the secondary rotor 20 engages a block 28 of the primary rotor 22. When the secondary 20 and primary 22 rotors are in this second, low speed position, the polarity of the magnets 18 provided on the secondary rotor 20 are aligned with the magnets 18 of similar polarity provided on the primary rotor 22, thereby increasing the torque provided by the motor 100. In some embodiments, the primary rotor 22 may be automatically rotated relative to the secondary rotor 20, such that the primary rotor 22 and secondary rotor 20 are in a position between the default position and the second, low speed position. In further embodiments yet, the primary rotor 22 may be automatically and gradually rotated relative to the secondary rotor 20 from the default position to the second, low speed position, and vice versa, as the load gradually increases or decreases, respectively. As the primary rotor 22 and secondary rotor 20 rotate relative to each other towards the second, low speed position, the torque of the motor 100 may increase. When the load encountered decreases or is caused to decrease, the magnetic coupling device 26 may cause the secondary 20 and primary 22 rotors to become operably recoupled in the default, high speed position, wherein the polarity of the magnets 18 provided on the secondary rotor 20 are aligned with the magnets 18 of opposite polarity provided on the primary rotor 22. The load at which the magnetic coupling device 26 becomes uncoupled may be varied, for example but not limited to, by varying the size of the magnetic coupling device 26. In one embodiment, the magnetic coupling device may be configured for a quick collapse above about 800 lbs. of force.

It will be understood that the biasing spring coupler/decoupler of FIG. 3 can be substituted for that of the magnetic coupling device 26 without departing from the scope of the invention.

In one embodiment, the primary rotor 22 may have a greater number of magnets than the secondary rotor 20. The windings 16 may be initially phased to the primary rotor 22. The magnetic coupling device 26 may hold the poles of the magnets 18 on the primary rotor 22 misaligned with the poles of the magnets 18 on the secondary rotor 20. As the load increases, and current is increased to the windings 16, the magnetic coupling device 26 is eventually overcome and the poles of the magnets 18 on the primary 22 and secondary 20 rotors align. In this position, both the primary 22 and secondary 20 rotors are transmitting torque to the load.

Furthermore, the primary 22 and secondary 20 rotors may be caused to rotate together in an opposite or second direction, thereby reversing the motor 100. In such second direction, operation of the primary 22 and secondary 20 rotors may generally be the same as described in relation to the first direction.

Although the present invention has been described with reference to preferred embodiments, persons skilled in the art will recognize that changes may be made in form and detail without departing from the spirit and scope of the invention. For example, components other than use of a magnetic coupling device may be used for coupling the secondary and primary rotors. Similarly, components other than a stop and block may be used to retain the primary rotor from overrotation.

We claim:

1. A permanent magnet, brushless motor comprising:
   a housing having a proximal end, a distal end, and a longitudinal axis extending between the proximal and distal ends;
   a fixed motor winding located inside the housing and coaxially aligned with the longitudinal axis of the housing;
   first and second rotors located inside the housing and coaxially aligned with the longitudinal axis and being rotationally moveable relative to the housing, to the motor winding, and to each other, the first rotor and second rotor each having spaced magnets mounted on surfaces thereof;
   a coupling device located between the first rotor and the second rotor that operably couple the first rotor and the second rotor in a first position;
   wherein upon encountering a load, the first rotor is mechanically rotated relative to the second rotor from a first position to a second position whereby higher torque is generated;

wherein in the first position, the polarity of the magnets provided on the first rotor are aligned with the magnets of opposite polarity provided on the second rotor; and wherein in the second position, the polarity of the magnets provided on the first rotor are aligned with the magnets of similar polarity provided on the second rotor.

2. The permanent magnet, brushless motor of claim 1, wherein the second rotor comprises a stop tab extending radially outward from the second rotor.

3. The permanent magnet, brushless motor of claim 2, wherein the first rotor comprises a block for engaging the stop tab of the second rotor when the first rotor is in the second position.

4. The permanent magnet, brushless motor of claim 1, wherein the first position is a default low torque position.

5. The permanent magnet, brushless motor of claim 3, wherein upon reduction of the load, the first rotor is mechanically rotated relative to the second rotor from the second position to the first position.

6. The permanent magnet, brushless motor of claim 1, wherein the coupling device is a magnetic coupling device.

7. The permanent magnet, brushless motor of claim 1 wherein the coupling device includes biasing means.

8. The permanent magnet, brushless motor of claim 1, wherein upon reduction of the load, the first rotor is mechanically rotated relative to the second rotor from the second position to the first position.

9. The permanent magnet, brushless motor of claim 1, further comprising means of linear actuation.

10. A method of increasing torque comprising:
    rotating a motor comprising a fixed motor winding and a first and second rotor coaxially aligned inside a housing, the first rotor and second rotor being rotationally moveable relative to the housing, to the motor winding and to each other, first rotor and second rotor each include circumferentially spaced magnets located thereon, wherein the first and second rotors are in an initial position and in a field weakened state for increased rotational speed;
    applying a load to the motor; and
    operably decoupling the first and second rotors relative to each other, such that the first and second rotors are rotationally shifted with respect to each other into a field non weakened state with an increased torque position.

11. The method of claim 10, wherein in the initial position, the magnets provided on the first rotor are aligned with magnets of opposite polarity on the second rotor, and in the increased torque position, the magnets provided on the first rotor are aligned with magnets of similar polarity on the second rotor.

12. The method of claim 11, wherein decoupling the first and second rotors relative to each other comprises reconfiguring a coupling device which operably couples the first and second rotors upon reaching a threshold load.

13. The method of claim 12, further comprising reducing the load such that the first and second rotors are rotationally shifted with respect to each other back to the initial position, and the coupling means operably realigns the first and second rotor.

14. The method of claim 10, further comprising reducing the load such that the first and second rotors are rotationally shifted with respect to each other back to the initial position.

15. A motor comprising:
    a housing;
    a fixed motor winding located inside the housing;
    first and second rotors coaxially aligned and located inside the housing and being rotationally moveable relative to the housing to the motor winding, and to each other, the first and second rotors having circumferentially spaced magnets on outer surfaces thereof; and
    means utilizing torque created within the motor for operably decoupling the first rotor from the second rotor from a default, low torque position to a high torque position based on reaching a threshold, increased load received by the motor.

16. The motor of claim 15, further comprising means for operably realigning the first rotor with the second rotor in the default, low torque position based on a reduction of load received by the motor.

17. The motor of claim 16, wherein the motor is a permanent magnet, brushless motor.

18. The motor of claim 16, wherein the second rotor includes a tab.

19. The motor of claim 18, wherein the first rotor comprises a block for engaging the tab of the second rotor when the first and second rotors are in the high torque position, whereby the first and second rotors are retained from over rotation with respect to each other.

* * * * *